(12) United States Patent
Zarmer et al.

(10) Patent No.: US 8,738,611 B1
(45) Date of Patent: May 27, 2014

(54) PRIORITIZING EMAIL BASED ON FINANCIAL MANAGEMENT DATA

(75) Inventors: Craig Lee Zarmer, Mountain View, CA (US); Lindsay Gordon Matthews, Palo Alto, CA (US); Kramer Chapman Weydt, Mountain View, CA (US); Louis Francisco DaRosa, Jr., Campbell, CA (US)

(73) Assignee: Intuit Inc., Mountain View, CA (US)

( * ) Notice: Subject to any disclaimer, the term of this patent is extended or adjusted under 35 U.S.C. 154(b) by 211 days.

(21) Appl. No.: 13/013,605

(22) Filed: Jan. 25, 2011

(51) Int. Cl.
*G06F 17/30* (2006.01)

(52) U.S. Cl.
USPC .......................................... 707/723; 707/732

(58) Field of Classification Search
USPC .......................................... 707/723, 732, 748
See application file for complete search history.

(56) References Cited

U.S. PATENT DOCUMENTS

| | | | |
|---|---|---|---|
| 6,147,977 A * | 11/2000 | Thro et al. ................... | 370/265 |
| 6,820,113 B2 * | 11/2004 | Wang et al. .................. | 709/206 |
| 7,219,130 B2 * | 5/2007 | Kumar et al. ................. | 709/206 |
| 8,180,841 B2 * | 5/2012 | Hardy et al. .................. | 709/207 |
| 8,312,096 B2 * | 11/2012 | Cohen et al. .................. | 709/207 |
| 2003/0195937 A1 * | 10/2003 | Kircher et al. ................ | 709/207 |
| 2003/0208388 A1 * | 11/2003 | Farkas et al. ...................... | 705/7 |
| 2005/0204002 A1 * | 9/2005 | Friend .......................... | 709/206 |
| 2007/0033546 A1 * | 2/2007 | Merry et al. .................. | 715/837 |
| 2007/0177560 A1 * | 8/2007 | Swartz et al. ................. | 370/338 |
| 2008/0189202 A1 * | 8/2008 | Zadoorian et al. ............. | 705/37 |
| 2009/0043679 A1 * | 2/2009 | Soumokil ....................... | 705/34 |
| 2009/0248481 A1 * | 10/2009 | Dick et al. ........................ | 705/9 |
| 2011/0044442 A1 * | 2/2011 | Abramson et al. ....... | 379/142.01 |
| 2011/0119258 A1 * | 5/2011 | Forutanpour et al. ......... | 707/723 |
| 2011/0194676 A1 * | 8/2011 | Hogan et al. ............... | 379/88.12 |

* cited by examiner

*Primary Examiner* — Cam-Linh Nguyen
(74) *Attorney, Agent, or Firm* — Osha Liang LLP

(57) ABSTRACT

A method to prioritize emails based on financial management data configured to analyze an email to determine an identity of a sender of the email, to compare the identity of the sender to contact information contained within business data of a financial management application to identify a portion of the business data as being associated with the sender, to analyze the portion of the business data to generate a score representing a level of importance of the sender to the email recipient based on a pre-determined criterion, to generate a priority ranking of the email among a number of emails based on the score, and to display the email among the number of emails to the recipient with a priority indication based on the priority ranking.

21 Claims, 5 Drawing Sheets

PRIORITIZING EMAIL BASED ON FINANCIAL MANAGEMENT DATA

BACKGROUND

Electronic mail, commonly referred to as email, is a method of exchanging digital messages across the Internet or other computer networks. Historically, email was transmitted directly from one user's computer to another user's computer, which required both computers to be online at the same time. Today's email systems are based on a store-and-forward model. Email servers accept, forward, deliver, and store messages. Users are no longer required to be online simultaneously and need only connect briefly, typically to an email server, to send or receive messages.

An email client, also referred to as email reader or mail user agent, is a computer program used to manage a user's email. In addition, web-based email applications allow a user to manage emails using a web browser.

Businesses receive large quantities of emails, and it can be difficult for a recipient of the emails to determine at a first glance which emails need to be read and acted on first, and which emails can wait. The recipient often fails to realize that important email is waiting in the inbox to be processed. As a result, important business opportunities may be lost, and important customers may not be given the best service.

SUMMARY

In general, in one aspect, the invention relates to a method to prioritize a plurality of emails received by a recipient. The method includes analyzing, using a processor of a computer system, a first email of the plurality of emails to determine an identity of a sender of the first email among a plurality of senders corresponding to the plurality of emails, comparing, using the processor, the identity of the sender to contact information contained within business data of a financial management application to identify a portion of the business data as being associated with the sender, wherein the recipient manages business activities conducted by the recipient with the plurality of senders using the financial management application, analyzing, using the processor, the portion of the business data to generate a score representing a level of importance of the sender to the recipient based on a pre-determined criterion, generating, using the processor, a first priority ranking of the first email among the plurality of emails based on the score, and displaying the plurality of emails to the recipient with a priority indication for the first email based on the first priority ranking.

In general, in one aspect, the invention relates to a system to prioritize a plurality of emails received by a recipient. The system includes (i) a financial management application executing on a processor of a computer system and comprising business data used by the recipient to manage business activities conducted by the recipient with a plurality of senders corresponding to the plurality of emails, (ii) a correlation module executing on the processor and configured to analyze a first email of the plurality of emails to determine an identity of a sender of the first email among the plurality of the senders and compare the identity to contact information contained within the business data to identify a portion of the business data as being associated with the sender, (iii) a prioritization module executing on the processor and configured to analyze the portion of the business data to generate a score representing a level of importance of the sender to the recipient based on a pre-determined criterion and generate a first priority ranking of the first email among the plurality of emails based on the score, and (iv) a display device configured to display the plurality of emails to the recipient with a priority indication of the first email based on the first priority ranking.

In general, in one aspect, the invention relates to a non-transitory computer readable storage medium embodying instructions executable by a computer to prioritize a plurality of emails received by a recipient. The instructions, when executed by the computer, include functionality for analyzing a first email of the plurality of emails to determine an identity of a sender of the first email among a plurality of senders corresponding to the plurality of emails, comparing the identity of the sender to contact information contained within business data of a financial management application to identify a portion of the business data as being associated with the sender, wherein the recipient manages business activities conducted by the recipient with the plurality of senders using the financial management application, analyzing the portion of the business data to generate a score representing a level of importance of the sender to the recipient based on a pre-determined criterion, generating a first priority ranking of the first email among the plurality of emails based on the score, and displaying the plurality of emails to the recipient with a priority indication for the first email based on the first priority ranking.

Other aspects of the invention will be apparent from the following detailed description and the appended claims.

DETAILED DESCRIPTION

Figure 1:
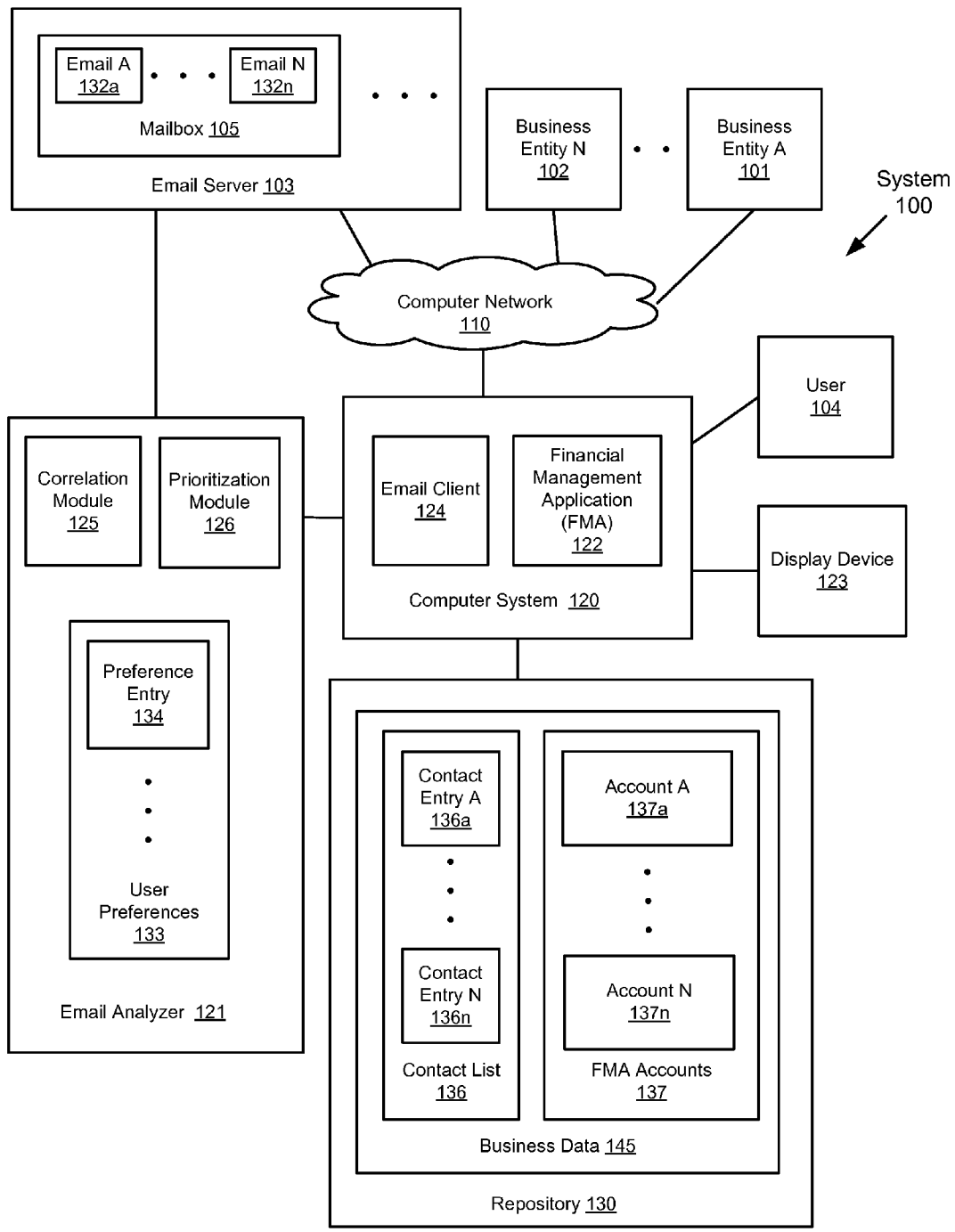
FIG. 1 shows a schematic diagram of a system for prioritizing emails based on financial management data in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method to prioritize incoming emails based on business data stored in a financial management application (FMA) that is related to senders of the emails. For example, the sender may be a customer or a vendor of the email recipient. Generally, email addresses (e.g., jsmith@examplebusiness.com, accounting@examplecompany.net) may be divided into two portions. The first is referred to as the local portion that appears prior to the "@" sign (i.e., jsmith, accounting), often the username of the sender or recipient. The second is referred to as the domain name portion that appears after the "@" sign (i.e., examplebusiness.com, examplecompany.net) describing the domain of the destination or origin of the email.

The business data associated with the sender may be identified by comparing sender information (e.g., individual name, business name, etc.) extracted from the email messages (e.g., sender email address or sender signature block in the email body) and contact information (e.g., individual name, business name, etc.) contained in an FMA. The incoming email messages are then prioritized based on such business data according to pre-determined user preferences, such as profitability, task due date, account receivable, etc. associated with the senders. For example, email messages may be displayed in such an order to give priority to a most profitable customer, a customer with tasks due soonest, a customer who owes the most money, etc. In one embodiment, the resulting prioritized email messages are displayed within the system of the present invention. In other embodiments, prioritizing tags are embedded in the email messages, which are displayed using the user's choice of email clients, such as Microsoft Outlook® (a registered trademark of Microsoft Inc., Redmond, Wash.), webmail client, or other email applications.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1. The system (100) of FIG. 1 depicts the components of an email prioritizing system in accordance with embodiments disclosed herein.

As shown in FIG. 1, the system (100) includes business entities (e.g., business entity A (101), business entity N (102)) and a computer system (120) coupled via a computer network (110). In particular, the computer network (110) may be the Internet, a wide area network, a local area network, WiFi network, or any other suitable wired or wireless network.

Further, the system (100) includes an email server (103) used by the user (e.g., user (104)) of the computer system (120) for communication via emails. In particular, the email server (103) may include mailboxes (e.g., mailbox (105)) for managing the emails received from the business entities (e.g., business entity A (101), business entity N (102)) by the user (e.g., user (104)) of the computer system (120). For example, the mailbox (105) may be configured under an email account of the user (104) on the email server (103) to store emails, such as email A (132a) and email N (132n) sent by the business entity A (101) and business entity N (102), respectively, to the user (104).

As shown in FIG. 1, the computer system (120) is installed with financial management application (FMA) (122) and email client (124). The system (100) further includes email analyzer (121) having correlation module (125), prioritization module (126), and user preferences (133). The system (100) also includes display device (123) and repository (130) coupled to the computer system (120). The repository (130) may be a database, persistent storage, or any other suitable type of storage device for storing business data (145) that includes FMA accounts (137) and contact list (136). Further, as shown in FIG. 1, the FMA accounts (137) includes account A (137a) and account N (137n) corresponding to business entity A (101) and business entity N (102), respectively. The contact list (136) includes contact entry A (136a) and contact entry N (136n) corresponding to business entity A (101) and business entity N (102), respectively. Further, each of the business entities (e.g., business entity A (101), business entity N (102)) may interact with a computing device (not shown) to send emails (e.g., email A (132a), email N (132n)) via the computer network (110) to the email server (103) of the user (104).

In one or more embodiments of the invention, a business entity (e.g., business entity A (101), business entity N (102)) may be any business operation (e.g., store, restaurant, personal service provider, consulting firm, online merchant, insurance agency, repair service, etc.) or an individual that engages in business activities (e.g., order or shipping products or services, submitting or requesting payments, requesting or providing customer supports, requesting or granting credit amounts, etc.) with the user (104). For example, whether as a business operation or an individual, the business entity (e.g., business entity A (101), business entity N (102)) may be a customer or a vendor of the user (104). Periodically, the business entity (e.g., business entity A (101), business entity N (102)) may send emails (e.g., email A (132a), email N (132n)) to the user (104) to the user (104) for a variety of purposes, such as to notify of an incoming order or payment, to follow up on a task due item, to request extension of account payable due dates, etc.

In one or more embodiments, such email messages (e.g., email A (132a), email N (132n)) may be sent manually from an email account of an individual on behalf of himself or an individual representing the business operation. In such embodiments, the sender email address may include (i) a username of the individual as the local portion and/or (ii) a name of the business entity as the domain name portion. In addition, the signature block in the email body may include the name of the individual and/or the name of the business entity.

In one or more embodiments, such email messages (e.g., email A (132a), email N (132n)) may be sent automatically by a business operation through automated mechanisms. In such embodiments, the sender email address may include (i) a name or other identity of a department (e.g., marketing, customer service, etc.) of the business entity as the local part and/or (ii) a name of the business entity as the domain name. In addition, the signature block in the email body may include the name or other identity of the department and/or the name of the business entity.

As noted above, the business entity (e.g., business entity A (101), business entity N (102)) may be a customer or vender of the user (104). In one or more embodiments, the user (104) may be an individual that is or associated with a customer or a vendor of the business entities (e.g., business entity A (101), business entity N (102)). For example, the user (104) may be or may represent a sole proprietor, small business owner (SBO), partner, manager, employee, consultant, accounting department, customer service department, marketing department, etc. associated with a user entity (not shown). In one or more embodiments, the email client (124) is configured to display emails (e.g., email A (132a), email N (132n)) on the display device (123) in an ordered list. Accordingly, the user (104) may view and/or respond to the emails (e.g., email A (132a), email N (132n)) according to an order in which they are displayed in the ordered list. For example, the email client (124) may be email software, such as Microsoft Outlook® (a registered trademark of Microsoft Inc., Redmond, Wash.), webmail client, or other email application.

In one or more embodiments of the invention, the FMA (122) is configured to manage business activities for the user (104) based on the business data (145) stored in the repository (130). For example, the FMA (122) may be accounting software, an order entry and inventory control software, investment portfolio management software, tax preparation software, customer relationship management (CRM)

application, or any other suitable type of business financial management software. In one or more embodiments, business data (145) is organized based on individual accounts set up within the FMA (122). For each business entity (e.g., business entity A (101), business entity N (102)) engaging in business activities with the user (104), a respective portion of the business data (145) unique to such business entity is stored separately within an account (e.g., account A (137a), account N (137n)) set up for the business entity. In one or more embodiments, account A (137a) contains account information (e.g., mailing address, billing information, etc.) and transaction records (e.g., customer orders, shipping records, invoices, customer service call log, CRM task list, etc.) associated with the business entity A (101). Similarly, account N (137n) contains account information and transaction records associated with the business entity N (102).

In one or more embodiments, a business entity (e.g., business entity A (101), business entity N (102)) may have access to certain information stored in its account within the FMA (122). In one or more embodiments, such access is controlled using an authentication scheme for security purposes. For example, business entity A (101) can only access account A (137a) or a portion thereof and does not have access to account N (137n) while business entity N (102) can only access account N (137n) or a portion thereof with no access to account A (137a).

In one or more embodiments, contact information of business entities (e.g., business entity A (101), business entity N (102)) engaging in business activities with the user (104) may be found in the business data (145). As noted above, the business data (145) is organized based on an individual customer or vendor account containing account information and transaction records. In one or more embodiments, contact information (e.g., individual name, business name, etc.) may be explicitly included in the account information (e.g., mailing address, billing information, etc.) or implicitly embedded in the transaction records (e.g., customer order, shipping record, invoice, customer service call log, CRM task list, etc.) of each of the FMA accounts (137). For example, contact information of business entity A (101) may be explicitly included in the account information or implicitly embedded in the transaction records of account A (137a).

In one or more embodiments, contact information may be organized, separate from the FMA accounts (137), in the contact list (136) for the user (104). For example, contact entry A (136a) may correspond to business entity A (101) and include the name of the business entity A (101) or the name of an individual (e.g., an owner, employee, contractor, etc.) associated with the business entity A (101). In one or more embodiments, the contact list (136) and the FMA accounts (137) may be separately maintained by the FMA (120) using links to associate the contact entries (e.g., contact entry A (136a), contact entry N (136n)) and corresponding account (e.g., account A (137a), account N (137n)).

In one or more embodiments, the computer system (120) and the display device are part of a local system directly operated and/or accessed by the user (104) for accessing functionalities of the FMA (122), email client (124), and the email analyzer (121). In one or more embodiments, the user (104) and the display device (123) may be a hardware device that includes additional computing capabilities and accesses the computer system (120) via the computer network (110) instead of the direct connection depicted in FIG. 1. For example, the computer system (120) may be a server platform operated by an application service provider (not shown). In one or more embodiments, in addition to being used by the user (104), the functionalities of the FMA (122) and the email analyzer (121) may also be accessed by other users such as the business entity A (101) and business entity N (102). For example, the FMA (122) and/or the email analyzer (121) may be a hosted application on the web or a software-as-a-service (SaaS) offering from the application service provider while the email client (124) may be separately included in the users' computers. As such, the FMA accounts (137) and contact list (136) may include information individually owned by each of the business entity A (101), business entity N (102), and the user (104). The computer system (120) may be any computing device suitable for hosting the FMA (122) and the email analyzer (121), such as, for example, a server computer, a desktop computer system, a laptop computer, a hand-held computing device such as a smart phone or any other suitable computing device.

In one or more embodiments of the invention, the email analyzer (121) includes a correlation module (125) that executes on a processor and is configured to (i) analyze an email (e.g., email A (132a), email N (132n)) received by the user (104) to determine an identity of a sender (e.g., business entity A (101), business entity N (102)) and (ii) compare the identity to contact information contained within the business data (145) to identify a portion of the business data (e.g., account A (137a), account N (137n)) as being associated with the sender (e.g., business entity A (101), business entity N (102)).

In one or more embodiments of the invention, the email analyzer (121) includes the prioritization module (126) that executes on a processor and is configured to (i) analyze the identified portion of the business data (e.g., account A (137a), account N (137n)) to generate a score of the corresponding sender (e.g., business entity A (101), business entity N (102)) based on user preferences (133) and (ii) generate a priority ranking of the analyzed email (e.g., email A (132a), email N (132n)) among all received emails based on the score. In one or more embodiments, the user preferences (133) represent an importance measure of various attributes (e.g., profitability, task due date urgency, account receivable level, etc.) of the business data (145). For example, preference entry (134) of the user preferences (133) may correspond to the profitability attribute and include a user assigned value representing its importance relative to other attributes (e.g., task due date urgency, account receivable level, etc.). In one or more embodiments, the score represents a level of importance of the sender (e.g., business entity A (101), business entity N (102)) of the email (e.g., email A (132a), email N (132n)) to the user (104).

In one or more embodiments of the invention, the email analyzer (121) may be separate from the computer system (120) and the email server (103). For example, the email analyzer (121) may be a hosted application on the web or a software-as-a-service (SaaS) offering from an application service provider while the computer system (120) may be a local system of the user (104).

In one or more embodiments of the invention, the email analyzer (121) may be integrated with the computer system (120) or the email server (103). As shown in FIG. 1, communication links are provided for the email analyzer (121) to access the mailbox (105) via the email server (103) and to access the Business data (145) via the FMA (122). More details of using the system (100) to prioritize emails received by the user (104) are described in reference to FIGS. 2-4 below.

Although specific details of the system (100) are described above for the scenario where business entities (e.g., business entity A (101), business entity N (102)) are senders and users (e.g., user (104)) are recipients of the emails (e.g., email A (132a), email N (132n)), one skilled in the art will appreciate that the system (100) may be used in a similar manner for the scenario where business entities (e.g., business entity A (101), business entity N (102)) are recipients and users (e.g., user (104)) are senders of the emails (e.g., email A (132a), email N (132n)). In other words, sent emails (e.g., organized within a sent item folder) in the mailbox (105) may be prioritized (e.g., displayed in an order based on the priority ranking) in a similar manner as received emails (e.g., organized within an inbox folder) in the mailbox (105).

Figure 2:
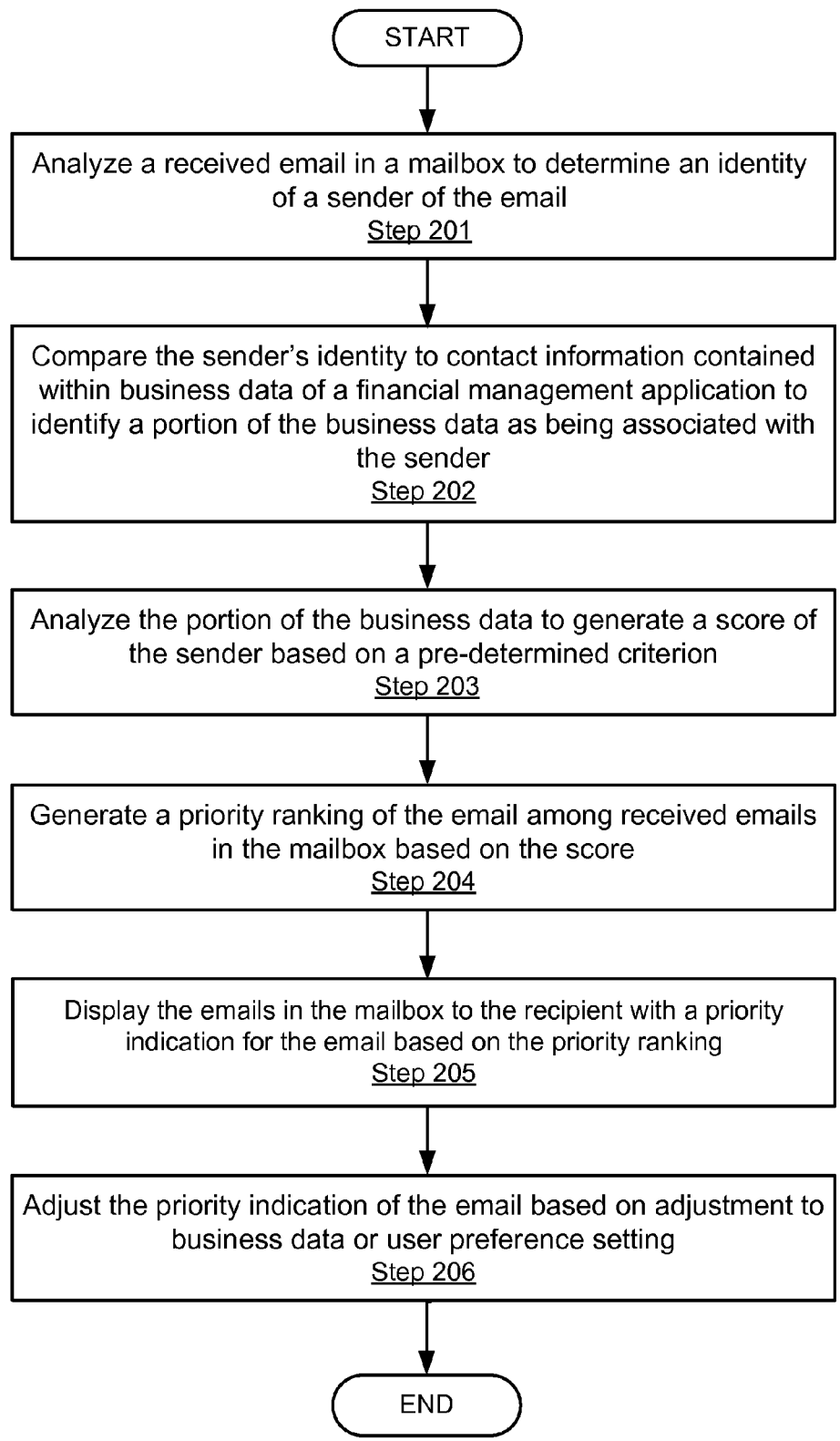
FIG. 2 shows a flowchart of a method for prioritizing emails based on financial management data in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100) described in reference to FIG. 1 above.

Initially in Step 201, an email is analyzed to determine an identity of a sender. For example, the email may be a received email among a set of received emails in a mailbox of a recipient. In one or more embodiments, the identity may be a name, an email alias, a telephone number, or a fax number found in the email header, sender email address, or signature block of the email.

As described above with respect to FIG. 1, the sender may be a customer or vendor of the email recipient. In particular, the recipient manages business activities with multiple customers and vendors using business data organized in various customer or vendor accounts in an FMA. Such business data may include account information, contact list, and transaction records that may contain contact information of corresponding customers or vendors. For example, the contact information may be explicitly included in account information, contact list, or implicitly embedded in transaction records.

In one or more embodiments, a type of the contact information available in FMA business data is identified. For example, data fields of the account information, contact list, or transaction records of the FMA may include one or more of a company name data field, a contact person name data field, a contact department name data field, a telephone number data field, a fax number data field, etc. In one or more embodiments, types of available contact information may be pre-determined for the FMA. In one or more embodiments, types of available contact information may be identified by analyzing data structure schema of the business data. For each type of available contact information contained in the business data, one or more of the email header, sender email address, or signature block of the email may be analyzed to determine whether it contains information consistent with the type. If such information is contained in the email header, sender email address, or signature block of the email, it is extracted as the identity of the sender.

For example, the email header, sender email address, or signature block of the email may be analyzed to look for a company name, a contact person name, a contact department name, a telephone number, a fax number, etc. In particular, the local part and the domain name of the sender email address may be analyzed separately. In one or more embodiments, such analysis may be based on pre-determined criteria using key word based or data format based computer heuristics. For example, the key word may include common first names and/or last names for an individual, common words associated with a business such as Co., Inc, LLC, etc. In another example, the data format may include common phone number format such as three digit area code, first three digits of the local phone number, and last four digits of the local phone number separated by a delimiter (e.g., dash, period, space, etc.). Similarly, the data format may include first name and last name concatenated using a delimiter (e.g., dash, period, space, etc.). In some examples, the delimiter may be excluded. In one or more embodiments, common formats of the email header, sender email address, or signature block may be stored in pre-determined templates to be used in such analysis.

In Step 202, the identity of the email sender is compared to contact information contained within the business data of the FMA to identify a portion of the business data as being associated with the email sender. In one or more embodiments, such comparison is performed for each type of available contact information contained in the business data. For example, if account information of a customer or vendor account in the FMA contains the same company name as that found in the email header, sender email address, or signature block of the email, the portion of the business data contained in the account is identified as being associated with the email sender. In another example, if a contact list entry contains the same contact person name as that found in the email header, sender email address, or signature block of the email, the portion of the business data contained in an account linked to the contact list entry is identified as being associated with the email sender.

In Step 203, the identified portion of the business data is analyzed to generate a score of the email sender based on a pre-determined criterion. Specifically, the score represents a level of importance of the email sender to the recipient. In one or more embodiments, the score is determined based on a user preference representing an importance measure of attribute(s) of the business data. For example, an attribute may be one of profit, sales, accounts payable, accounts receivable, and task due dates associated with the identified portion of the business data. In particular, such attribute may be computed based on transaction records contained in the business data using FMA functionalities.

In one or more embodiments, the pre-determined criterion includes a user preference weighted evaluation of the attribute with respect to the identified portion of the business data. For example, the user preferences may specify an order of importance for each of the attributes, such as profit>sales>accounts payable>accounts receivable>task due dates. In another example, the user preferences may specify the importance measure as a weight factor of each of the attributes, such as profit assigned a weight of 3, sales assigned a weight of 2, accounts payable assigned a weight of 2, accounts receivable assigned a weight of 1, and task due dates assigned a weight of 0.5. Other scoring schemes may also be used to compute the level of importance of the email sender based on associated business record attributes. In one or more embodiments, the score is computed for each received email in the mailbox of the recipient.

In Step 204, a priority ranking of the received email is generated among all received emails based on the score. In one or more embodiments, the emails are ranked in a priority order with higher scoring emails placed higher in the order. For example, the highest scoring email is assigned a first priority ranking, the second highest scoring email is assigned a second priority ranking, etc.

In Step 205, each of the received emails is displayed to the recipient with a priority indication based on its priority ranking. For example, the priority indication may be an icon displayed next to the displayed email where the priority is reflected in the color, size, number of stars, etc. of the icon. In another example, the priority indication may be the displayed order of the emails. For example, higher priority emails may be displayed at the beginning of a list or displayed first in a sequence. In one or more embodiments, the priority indication is provided to an email client used by the recipient for displaying the emails. Accordingly, the received emails are displayed using the email client based on the priority indication.

In Step 206, the priority indication of the email is adjusted based on adjustment to business data or user preference settings. Generally, the emails are received by and displayed to the recipient while additional business data may be generated concurrently in the FMA due to on-going business activities between the email sender and recipient. In one or more embodiments, the priority indication of the email is adjusted in real time to reflect the most current incoming emails prioritized based on the updated business data. For example, an order just received will immediately re-prioritize all the displayed emails once the order is entered into the FMA, especially so if sales is rated high in the user preferences. In another example, a customer support generated new task with an urgent due date will immediately re-prioritize all the displayed emails once the new task is entered into the FMA (e.g., a CRM), especially so if task due date is rated high in the user preferences. In one or more embodiments, the priority indication of the email is adjusted in real time based on real time adjustments to a corresponding score and priority ranking in response to the business data adjustments.

In one or more embodiments, the priority indication of the email is adjusted in real time to reflect the most current settings in the user preferences. For example, the user may change the preference to give higher priority to task due date over profitability. In response to such a preference change, the priority indication of the displayed email is adjusted in real time according to the new preference settings. For example, an email received from a customer with an immediate delivery date is moved to the top of the email list displacing a previous high priority email received from another customer contributing to a highest profit margin.

Although specific details of the method are described above for the scenario where received emails are prioritized based on business data associated with the email senders, one skilled in the art will appreciate that the method may be used in a similar manner for the scenario where sent emails are prioritized (e.g., displayed in an order based on the priority ranking) based on business data associated with the email recipients.

Figure 3:
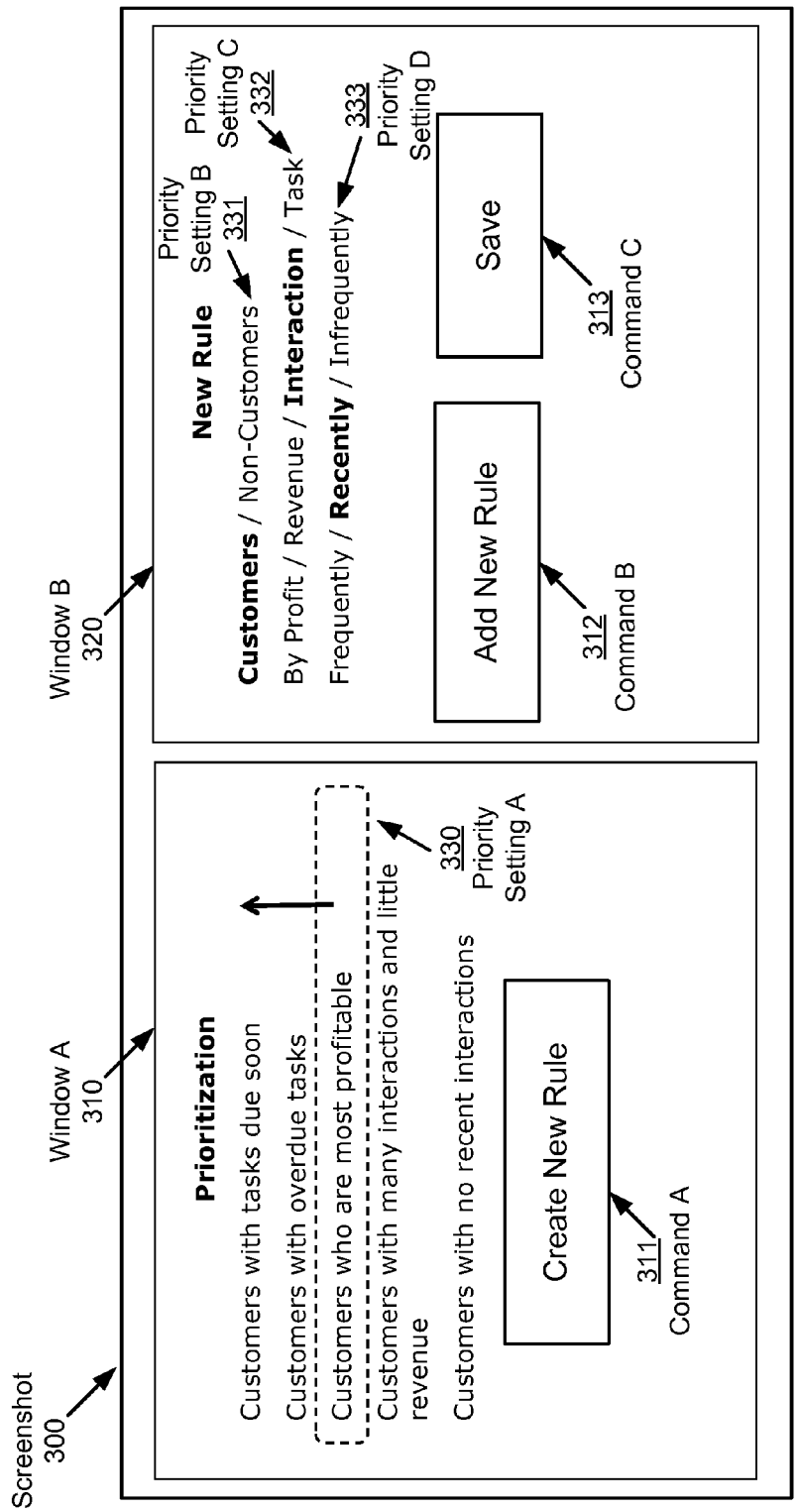
FIGS. 3 and 4 show examples of prioritizing emails based on financial management data in accordance with one or more embodiments of the invention.
Figure 4:
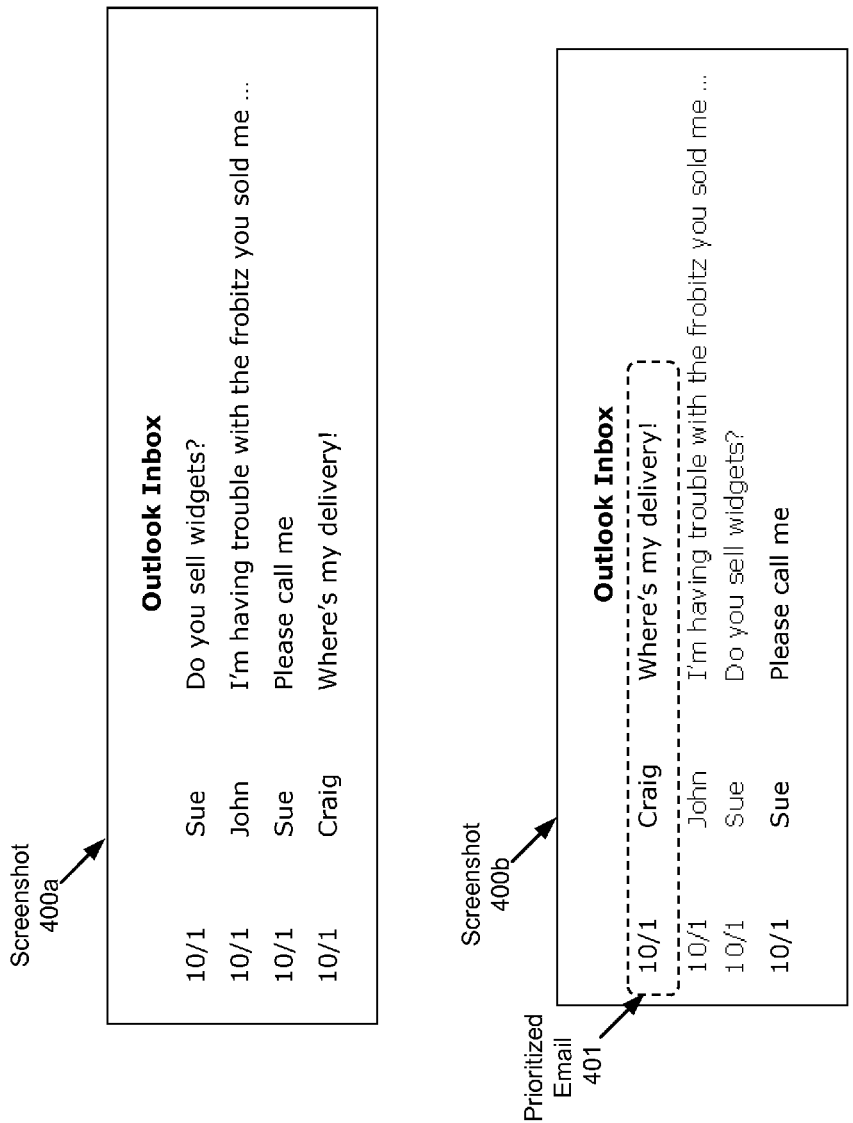

FIGS. 3 and 4 depict screen shots of an application example in accordance with one or more embodiments of the invention. This example application may be practiced using the system (100) of FIG. 1 and based on the method described with respect to FIG. 2 above.

In the example, an email analyzer is linked with or embedded in a financial management application (e.g., QuickBooks® (a registered trademark of Intuit Inc., Mountain View, Calif.), a customer relationship management application, etc.) and is provided access to the business email via Internet Message Access Protocol (IMAP). A user uses the financial management application to manage customer data and has determined (via user preference settings in the email analyzer, shown as the screenshot (300) in FIG. 3) that the most profitable customers (e.g., a customer "Craig" shown in FIG. 4) should be handled first in responding to emails. A new email arrives in the mailbox that triggers the email analyzer to search customer data and identify a match to the sender email address. Based on the customer data associated with the match, it is determined that the lifetime profitability value of the email sender "Craig" as a customer is in the top 10%. Accordingly, the email is tagged as "Most Important" (e.g. via IMAP) in the mailbox. When the business checks the incoming emails (e.g., shown as the screenshot (400b) of FIG. 4), the new email, among other emails, has already been tagged and thus sorted to the top for immediate action.

FIG. 3 depicts a screenshot (300) having window A (310) and window B (320). Window A (310) is used to configure user preference for prioritizing the emails by re-arranging a list of pre-determined priority settings. As shown in window A (310), pre-determined priority settings include "customers with tasks due soon," "customers with overdue tasks," "customers who are most profitable," "customers with many interactions and little revenue," and "customers with no recent interactions." Further, the priority setting A (330) "customers who are most profitable" is shown as being dragged (indicated by the arrow) by the user to the top of the prioritization preference list. Once the priority is re-arranged, the user may click the command A (311) to add the re-arranged priority as a new rule to the user preference. As described above, this new rule may be used to prioritize emails received by a user. Accordingly, as illustrated in FIG. 4 below, emails received from an email sender "Craig," who is rated as a top 10% lifetime profitability customer in the QuickBooks® used by the user, will be displayed at the top of the email inbox above other emails received from other customers rated as less profitable.

A new rule may also be added to the user preference by using window B (320). Once the user clicks the command B (312), priority setting B (331) is activated or displayed where, in this example, the user has selected customers as more important than non-customers. For example, an email is identified as a non-customer email if the email analyzer fails to find a match in the financial management application. Once the customer is selected as more important, priority setting C (332) is activated or displayed where, in this example, the user has selected interaction as more important than profit, revenue, or task. Once the interaction is selected as more important, priority setting D (333) is displayed or activated where, in this example, the user has selected how recent the interaction is as more important than how frequent or infrequent the interaction is. Once the user completes these selections and clicks command C (313), a new rule is added to the user preferences. For example, this new rule may be used to prioritize emails received by a business. Accordingly, emails received from an email sender "Craig," who is identified as a customer with most recent order placement in the QuickBooks® used by the business, will be displayed at the top of the email inbox, as illustrated in FIG. 4 below.

FIG. 4 depicts a screenshot (400a) showing emails displayed in an email inbox without prioritization and a screenshot (400b) showing emails displayed in the email client inbox with prioritization. As shown in the screenshot (400a), four emails have been received on October 1 from senders "Sue," "John," and "Craig" arranged in an order based on the time of receipt (not shown) of the email. As shown in screenshot (400b), the email sender "Craig" is determined by the email analyzer as the most profitable customer and/or with the most recent interaction (e.g., order placement) as compared to "Sue" and "John." According, prioritized email (401) from Craig is moved to the top of the list in the email client inbox. Similarly, the display order of other emails are also re-arranged based on sender scores computed based on the user preference specified in FIG. 3 above. In this example, the two emails received from Sue are grouped together and displayed below the email received from John based on a lower sender score associated with Sue.

Figure 5:
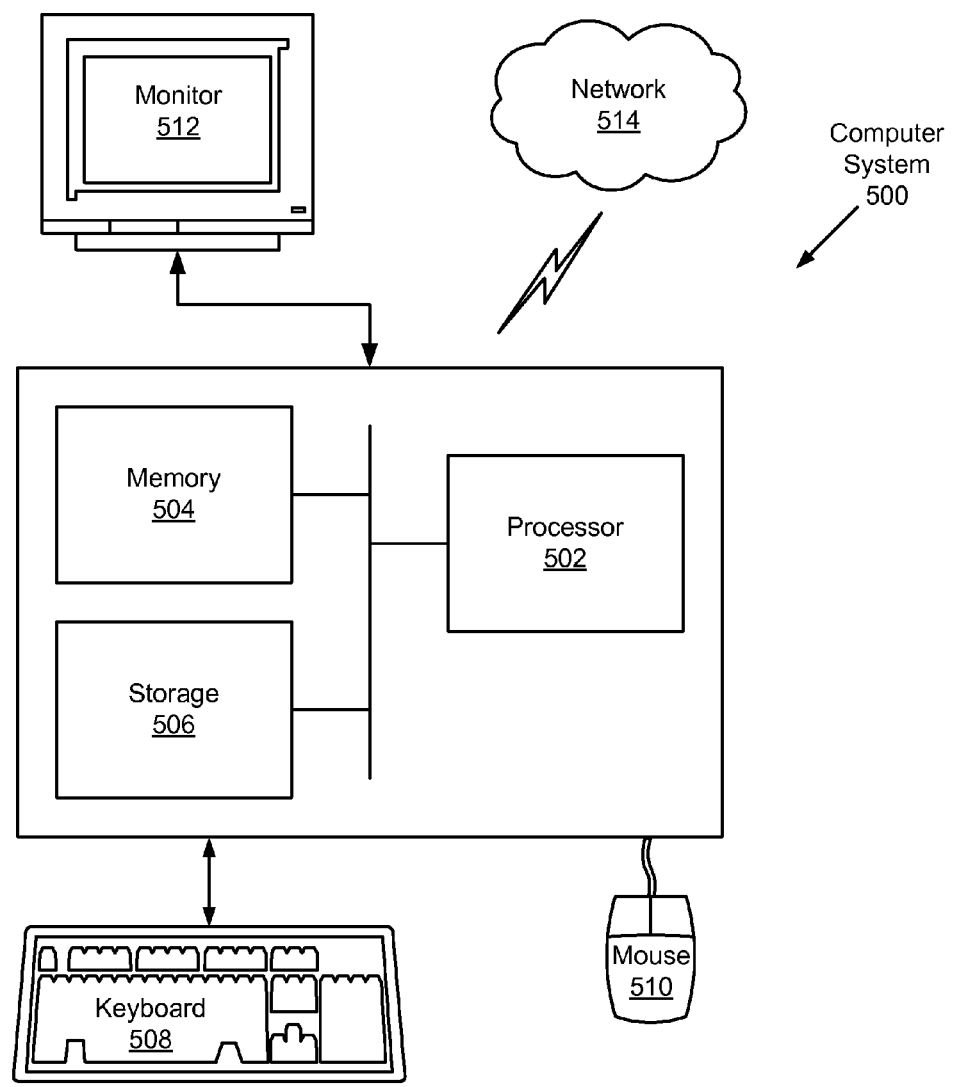
FIG. 5 shows a diagram of a computer in accordance with one or more embodiments of the invention.

Embodiments of the invention may be implemented on virtually any type of computer regardless of the platform being used. For example, as shown in FIG. 5, a computer system (500) includes one or more processor(s) (502) such as a central processing unit (CPU), integrated circuit, or other hardware processor, associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer system (500) may also include input means, such as a keyboard (508), a mouse (510), or a microphone (not shown). Further, the computer system (500) may include output means, such as a monitor ((512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network)) with wired and/or wireless segments via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., various elements of the computer system (120), the repository (130), etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to prioritize a plurality of emails received by a recipient, comprising:
    analyzing, using a processor of a computer system, a first email of the plurality of emails to determine an identity of a sender of the first email among a plurality of senders corresponding to the plurality of emails, wherein the sender is a customer of the recipient;
    comparing, using the processor, the identity of the sender to contact information of a financial management application to identify customer account information managed by the recipient and for the sender as the customer of the recipient;
    computing, using the financial management application and in response to analyzing the first email, an account receivable and due date attribute of the sender from the customer account information;
    generating, using the processor, a first priority ranking of the first email among the plurality of emails based on the account receivable and due date attribute; and
    displaying the plurality of emails to the recipient with a priority indication for the first email based on the first priority ranking.

2. The method of claim 1, further comprising:
    receiving an adjustment to the business data subsequent to generating the first priority ranking of the first email;
    adjusting the first priority ranking based on the adjustment to generate an adjusted first priority ranking of the first email; and
    adjusting the priority indication of the first email based on the adjusted first priority ranking.

3. The method of claim 1, further comprising:
    obtaining user preferences representing an importance measure of the account receivable and due date attribute of the business data,
    wherein the pre-determined criterion comprises an evaluation of the account receivable and due date attribute with respect to the portion of the business data.

4. The method of claim 3, further comprising:
    receiving an adjustment to the user preferences subsequent to generating the first priority ranking of the first email;
    adjusting the first priority ranking based on the adjustment to generate an adjusted first priority ranking of the first email; and
    adjusting the priority indication of the first email based on the adjusted first priority ranking.

5. The method of claim 1, further comprising:
    identifying a type of the contact information contained within the business data as required by the financial management application,
    wherein analyzing the first email comprises analyzing at least one item selected from a group consisting of a header of the first email, an email address of the first email, a domain name of the email address of the first email, and a signature block of the first email to extract a data item consistent with the type, and
    wherein the identity of the sender comprises the data item.

6. The method of claim 1,
    wherein the identity of the sender comprises at least one item of the sender selected from a group consisting of a name, an email alias, a telephone number, and a fax number, and
    wherein the portion of the business data comprise the at least one item.

7. The method of claim 1, wherein the business data comprise at least one selected from a group consisting of profit, sales, accounts payable, accounts receivable, and task due dates associated with the plurality of senders.

8. A system to prioritize a plurality of emails received by a recipient, comprising:
    a financial management application executing on a processor of a computer system and used by the recipient to manage business activities conducted by the recipient with a plurality of senders corresponding to the plurality of emails;
    a repository storing business data of the financial management application;
    a correlation module executing on the processor and configured to:
        analyze a first email of the plurality of emails to determine an identity of a sender of the first email among the plurality of the senders, wherein the sender is a customer of the recipient; and compare the identity to contact information contained within the business data to identify customer account information managed by the recipient and for the sender as the customer of the recipient, wherein the financial management application is configured to:

compute, in response to analyzing the first email, an account receivable and due date attribute of the sender from the customer account information;

a prioritization module executing on the processor and configured to:

generate a first priority ranking of the first email among the plurality of emails based on the account receivable and due date attribute; and a display device configured to display the plurality of emails to the recipient with a priority indication of the first email based on the first priority ranking.

9. The system of claim 8, wherein the prioritization module is further configured to:

receive an adjustment to the business data subsequent to generating the first priority ranking of the first email; and adjust the first priority ranking based on the adjustment to generate an adjusted first priority ranking of the first email, and wherein the display device is further configured to adjust the priority indication of the first email based on the adjusted first priority ranking.

10. The system of claim 8, the prioritization module further configured to:

obtain user preferences representing an importance measure of the account receivable and due date attribute of the business data, wherein the pre-determined criterion comprises an evaluation of the account receivable and due date attribute with respect to the portion of the business data.

11. The system of claim 10, wherein the prioritization module is further configured to:

receive an adjustment to the user preferences subsequent to generating the first priority ranking of the first email; and adjust the first priority ranking based on the adjustment to generate an adjusted first priority ranking of the first email, and wherein the display device is further configured to:

adjust the priority indication of the first email based on the adjusted first priority ranking.

12. The system of claim 8, the correlation module further configured to:

identify a type of the contact information contained within the business data as required by the financial management application, wherein analyzing the first email comprises analyzing at least one item selected from a group consisting of a header of the first email, an email address of the first email, a domain name of the email address of the first email, and a signature block of the first email to extract a data item consistent with the type, and wherein the identity of the sender comprises the data item.

13. The system of claim 8, wherein the identity of the sender comprises at least one item of the sender selected from a group consisting of a name, an email alias, a telephone number, and a fax number, and wherein the portion of the business data comprise the at least one item.

14. The system of claim 8, wherein the business data comprise at least one selected from a group consisting of profit, sales, account payable, account receivable, and task due date associated with the plurality of senders.

15. A non-transitory computer readable storage medium embodying instructions executable by a computer to prioritize a plurality of emails received by a recipient, the instructions, when executed by the computer, comprising functionality for:

analyzing a first email of the plurality of emails to determine an identity of a sender of the first email among a plurality of senders corresponding to the plurality of emails, wherein the sender is a customer of the recipient;

comparing the identity of the sender to contact information of a financial management application to identify customer account information managed by the recipient and for the sender as the customer of the recipient;

computing, using the financial management application and in response to analyzing the first email, an account receivable and due date attribute of the sender from the customer account information;

generating a first priority ranking of the first email among the plurality of emails based on the account receivable and due date attribute; and displaying the plurality of emails to the recipient with a priority indication for the first email based on the first priority ranking.

16. The non-transitory computer readable storage medium of claim 15, the instructions, when executed by the computer, further comprising functionality for:

receiving an adjustment to the business data subsequent to generating the first priority ranking of the first email;

adjusting the first priority ranking based on the adjustment to generate an adjusted first priority ranking of the first email; and adjusting the priority indication of the first email based on the adjusted first priority ranking.

17. The non-transitory computer readable storage medium of claim 15, the instructions, when executed by the computer, further comprising functionality for:

obtaining user preferences representing an importance measure of the account receivable and due date attribute of the business data, wherein the pre-determined criterion comprises an evaluation of the account receivable and due date attribute with respect to the portion of the business data.

18. The non-transitory computer readable storage medium of claim 17, the instructions, when executed by the computer, further comprising functionality for:

receiving an adjustment to the user preferences subsequent to generating the first priority ranking of the first email;

adjusting the first priority ranking based on the adjustment to generate an adjusted first priority ranking of the first email; and adjusting the priority indication of the first email based on the adjusted first priority ranking.

19. The non-transitory computer readable storage medium of claim 15, the instructions, when executed by the computer, further comprising functionality for:

identifying a type of the contact information contained within the business data as required by the financial management application, wherein analyzing the first email comprises analyzing at least one item selected from a group consisting of a header of the first email, an email address of the first email, a domain name of the email address of the first email, and a signature block of the first email to extract a data item consistent with the type, and wherein the identity of the sender comprises the data item.

20. The non-transitory computer readable storage medium of claim 15, wherein the identity of the sender comprises at least one item of the sender selected from a group consisting of a name, an email alias, a telephone number, and a fax number, and wherein the portion of the business data comprise the at least one item.

21. The non-transitory computer readable storage medium of claim 15, wherein the business data comprise at least one selected from a group consisting of profit, sales, accounts payable, accounts receivable, and task due dates associated with the plurality of senders.

\* \* \* \* \*